(12) United States Patent
Robinson

(10) Patent No.: US 6,872,341 B2
(45) Date of Patent: Mar. 29, 2005

(54) METHOD OF MAKING A BAIT STATION OF WAX MATRIX MATERIAL

(76) Inventor: Richard David Robinson, 18706 Mach One Dr., Fort Pierce, FL (US) 34987

(*) Notice: Subject to any disclaimer, the term of this patent is extended or adjusted under 35 U.S.C. 154(b) by 362 days.

(21) Appl. No.: 10/247,297

(22) Filed: Sep. 20, 2002

(65) Prior Publication Data

US 2003/0071390 A1 Apr. 17, 2003

Related U.S. Application Data

(60) Provisional application No. 60/323,386, filed on Sep. 20, 2001.

(51) Int. Cl.[7] .......................... A01N 25/00; B29C 39/06; B29C 45/00; B65B 63/08
(52) U.S. Cl. .......................... 264/132; 53/440; 264/259; 264/297.1; 264/297.2; 264/297.3; 264/297.6; 264/330; 424/84
(58) Field of Search .................. 264/132, 259, 264/297.1, 297.2, 297.3, 297.6, 330; 53/440; 424/84

(56) References Cited

U.S. PATENT DOCUMENTS

| | | | | |
|---|---|---|---|---|
| 4,054,636 A | * | 10/1977 | Menig | 264/330 X |
| 4,514,960 A | * | 5/1985 | Sears | 53/440 |

* cited by examiner

Primary Examiner—Leo B. Tentoni
(74) Attorney, Agent, or Firm—Greenberg Traurig, LLP; Richard E. Kurtz, II

(57) ABSTRACT

A system and method of mass-producing a bait station of wax matrix material for pesticide or insecticide delivery is disclosed. The apparatus and method includes a water-heated vat 110 which supplies liquid wax matrix material to molds which may be of various forms in accordance with the desired bait station to be manufactured. A fluid pump 120 pumps the wax matrix material from the vat through a tube 130 into molding tubes 140. At a molding tube station 140 the molds are filled and then carried by a conveyer belt 100 to a cooling tunnel 160. The wax-containing molds may be shaken by an in-line shaker in order to reduce air bubbles in the wax matrix. After the wax-containing molds are cooled by the cooling tunnel 160 the conveyer carries them to a labeling station 170, after which the finished bait stations are removed from their molds and packaged.

4 Claims, 1 Drawing Sheet

METHOD OF MAKING A BAIT STATION OF WAX MATRIX MATERIAL

This application claims the benefit of provisional Application No. 60/323,386, filed on Sep. 20, 2001.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The invention relates in general to the field of pesticide delivery device manufacture, and in particular to an apparatus and method for mass producing bait stations of wax matrix material.

BACKGROUND OF THE INVENTION

Insects, and the damage they cause, are a serious economic threat to fruit and vegetable farmers worldwide. For example, importing countries will block fruit and vegetable shipments from certain exporting countries, rather than risk their phytosanitary status by importing foreign fruits and vegetables.

One type of insect that is of major concern is the fruit fly. There are over 4,000 species of fruit flies worldwide today. The genus *Anastrepha*, found throughout the Americas, Florida and the Caribbean Islands, comprises approximately 180 species. Of these 180 species, 7 cause senous economic damage.

The *Ceratitis Capatata*, commonly known as the Mediterranean Fruit Fly (Medfly), is the most widespread and damaging fruit fly in the world. The Medfly can currently be found in Guatemala and the Mexican states bordering Guatemala. If the Medfly reaches Oaxaca and/or Veracruz, it will have a corridor to the United States. Countermeasures, particularly effective means of pest control, are needed to prevent the spread of the Medfly to the United States.

One way of controlling the fruit fly is through the use of insecticides and pesticides. In particular, an efficient and attractive way of controlling the fruit fly is through the use of bait stations, which contain a lure and an insecticide or pesticide. The fly is lured to the bait station, consumes the bait and the insecticide or pesticide and is affected accordingly. One type of bait station is comprised of a pesticide or insecticide in combination with a paraffin-wax-containing carrier. In this type of bait station the paraffin wax acts as a matrix, holding a lure and insecticide or pesticide and slowly releasing the lure and insecticide as the wax matrix material breaks down over time. This type of bait station is very effective and requires less human labor to deploy and maintain than conventional bait stations.

SUMMARY OF THE INVENTION

The invention is a novel apparatus and method which allows for the mass production of bait stations of wax matrix material.

Additional features and advantages of the invention will be set forth in the description which follows, and in part will be apparent from the description, or may be learned by practice of the invention. The objectives and other advantages of the invention will be realized and attained by the structures and methods particularly pointed out in the written description and claims hereof as well as the appended drawing.

To achieve these and other advantages and in accordance with the purpose of the present invention, as embodied and broadly described, there is provided an apparatus for the mass production of bait stations of wax matrix material for insect and pest control.

It is to be understood that both the foregoing general description and the following detailed description are exemplary and explanatory and are intended to provide further explanation of the invention as claimed.

BRIEF DESCRIPTION OF THE DRAWINGS

The accompanying drawing, which is included to provide a further understanding of the invention and is incorporated in and constitutes a part of this specification, illustrates embodiments of the invention and together with the description serves to explain the principles of the invention.

DETAILED DESCRIPTION OF A PREFERRED EMBODIMENT

Figure 1:
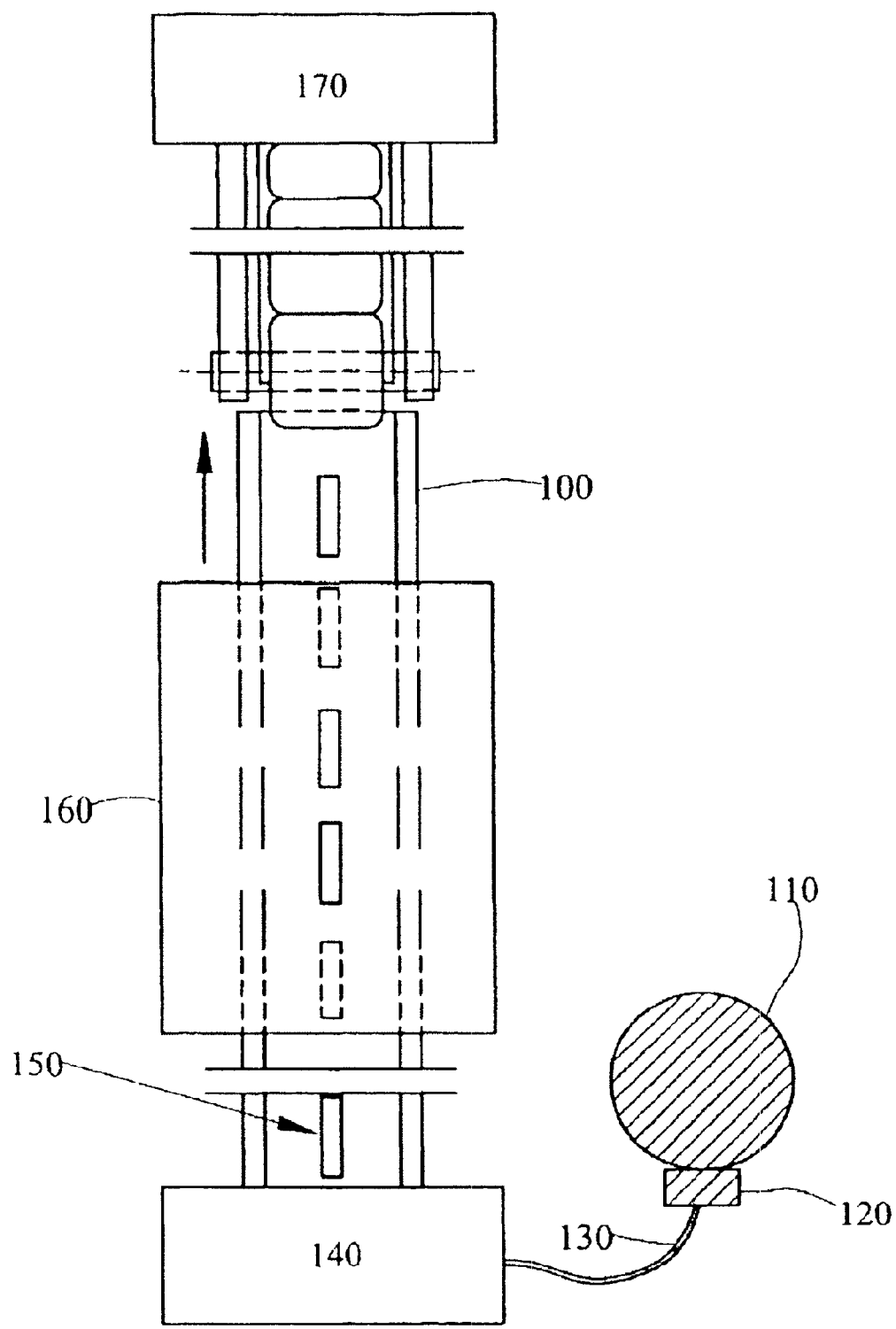
FIG. 1 is a top view of an embodiment of the present invention.

Reference will now be made in detail to the preferred embodiments of the present invention, with one example thereof being illustrated in the accompanying drawing.

FIG. 1 is a top view of an embodiment of the present invention. In the embodiment illustrated in FIG. 1 a conveyer belt is utilized to carry wax molds through various stations that each contribute to the production of bait stations of wax matrix material containing a lure and insecticide or pesticide. The invention allows for the mass output of wax matrices of a desired shape and color, depending upon the attributes of the fly species to be attracted and controlled, the mode of delivery of the bait stations, and the environment in which the bait stations will be used. In this respect the wax molds may be in various forms for producing various types of bait stations.

For example, the molds may be shaped to form bait stations which are thin strips of material that can be hung from or affixed to trees or other objects in the field. Alternatively, the molds may be of a shape which forms pellets that can be fired at objects such as trees in the field to form bait stations. The use of such pellets is described in U.S. patent application Ser. No. 10/051,382 filed Jan. 22, 2002, entitled "Chemical Agent Delivery Device and Method of Using Same," the entire disclosure of which is incorporated herein by reference. Other mold forms, such as leaf shapes and other shapes which integrate well with a field environment, are possible without departing from the spirit and scope of the invention.

In a preferred embodiment, the system and method of the invention is used to mass produce an agricultural fruit fly bait station which is comprised of a paraffin wax mixed with a lure and agricultural insecticide. Suitable insecticides include, e.g., Spinosyns (macrocyclic lactone isolated from soil organism *Saccharopolyspora spinosa*). The wax matrix material is stored in a water-heated vat 110. The wax matrix material is also mechanically agitated to preserve the mixture. A fluid pump 120, capable of handling a liquid of approximately 200° F. in temperature, is used to pump the wax matrix material out of the vat 110 through tubing which carries the wax matrix material to the mold-filling tubes 140. At this point pieces of cloth, such as cheese cloth, may be inserted in the bottoms of the mold in order to add support to the wax matrix material when it sets and hardens.

Once the wax matrix material reaches the mold-filling tubes 140, each mold 150 is then filled according to its capacity. After the mold 150 is filled the conveyer belt 100 carries the mold 150 containing the liquid mixture of wax matrix material through a chill tunnel 160, which cools and sets the wax in the mold. In any embodiment an in-line shaker, located before the chill tunnel, can be utilized to reduce the amount of air bubbles in the wax matrix material. After the wax material in the mold 140 is set in the chill tunnel 160, the mold is carried by the conveyor belt 100 to an Auto Labeler 170 located on the conveyer belt 110, where labeling is applied. The finished bait station is then automatically or manually removed from the mold and packaged.

I claim:

1. A method for producing a bait station of wax matrix material comprising:

mixing wax with a lure and at least one pesticide to generate a liquid wax matrix material;

storing the wax matrix material in a heated storage unit to maintain its liquidity;

utilizing a conveyer belt to carry at least one wax mold under at least one mold-filling tube;

pumping the wax matrix material through at least one mold-filling tube into at least one wax mold;

utilizing the conveyer belt to carry at least one filled wax mold through a chill tunnel to harden the wax matrix material and form a bait station; and removing the bait station from the mold.

2. The method of claim 1, further comprising the step of inserting a substratum into the bottom of at least one mold to add support to the wax matrix material.

3. The method of claim 1, further comprising the step of applying labeling to the bait station.

4. The method of claim 1, further comprising the step of packaging the bait station.

* * * * *